US011511965B2

(12) United States Patent
Nakari et al.

(10) Patent No.: US 11,511,965 B2
(45) Date of Patent: Nov. 29, 2022

(54) BACKUP POWER SUPPLY FOR ELEVATOR

(71) Applicant: KONE Corporation, Helsinki (FI)

(72) Inventors: Arto Nakari, Helsinki (FI); Olli Pokkinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 349 days.

(21) Appl. No.: 16/796,674

(22) Filed: Feb. 20, 2020

(65) Prior Publication Data

US 2020/0325000 A1 Oct. 15, 2020

(30) Foreign Application Priority Data

Apr. 9, 2019 (EP) ..................................... 19168226

(51) Int. Cl.
*B66B 5/02* (2006.01)
*H02J 9/06* (2006.01)
(Continued)

(52) U.S. Cl.
CPC .............. *B66B 5/028* (2013.01); *H02J 3/001* (2020.01); *H02J 9/04* (2013.01); *H02J 9/062* (2013.01); *H01H 2300/018* (2013.01)

(58) Field of Classification Search
CPC ... B66B 5/028; H02J 3/001; H02J 9/04; H02J 9/062; H01H 2300/018
(Continued)

(56) References Cited

U.S. PATENT DOCUMENTS

| 5,864,474 A | 1/1999 | Jang | |
|---|---|---|---|
| 2010/0044160 A1* | 2/2010 | Agirman | B66B 1/302 187/290 |

(Continued)

FOREIGN PATENT DOCUMENTS

| EP | 3 403 971 A1 | 11/2018 |
|---|---|---|
| WO | WO 2008/100259 A1 | 8/2008 |

OTHER PUBLICATIONS

Extended European Search Report for EP 19168226.9 dated Oct. 11, 2019.

*Primary Examiner* — Michael R. Fin
(74) *Attorney, Agent, or Firm* — Birch Stewart Kolasch & Birch, LLP

(57) ABSTRACT

An elevator includes an elevator motor, a motor drive for the elevator motor having a frequency converter including a rectifier bridge, an inverter bridge and a DC link in between, which frequency converter is controlled via a controller, the rectifier bridge being connected to AC mains via three feed lines including chokes, and the rectifier bridge being realised via controllable semiconductor switches, an isolation relay being located between the feed lines and AC mains, a backup power supply at least for emergency drive operation, an emergency control for performing an automatic emergency drive, the backup power supply is via a first switch connectable with only a first of the feed lines. A second and/or third of the feed lines is via a second switch connectable as power supply to a car door arrangement, the first switch as well as the second switch are controlled by the emergency control, and the emergency control is connected to a manual drive circuit having a manual drive switch for a manual rescue drive. The elevator includes a first feedback circuit configured to provide to the emergency control first information indicating the switching state of the isolation relay, a second feedback circuit which is configured to provide to the emergency control second information indicating switching state of the first switch. The emergency control is configured to selectively allow or prevent the emergency drive operation on the basis of the first information and the second information.

20 Claims, 2 Drawing Sheets

Figure 1:
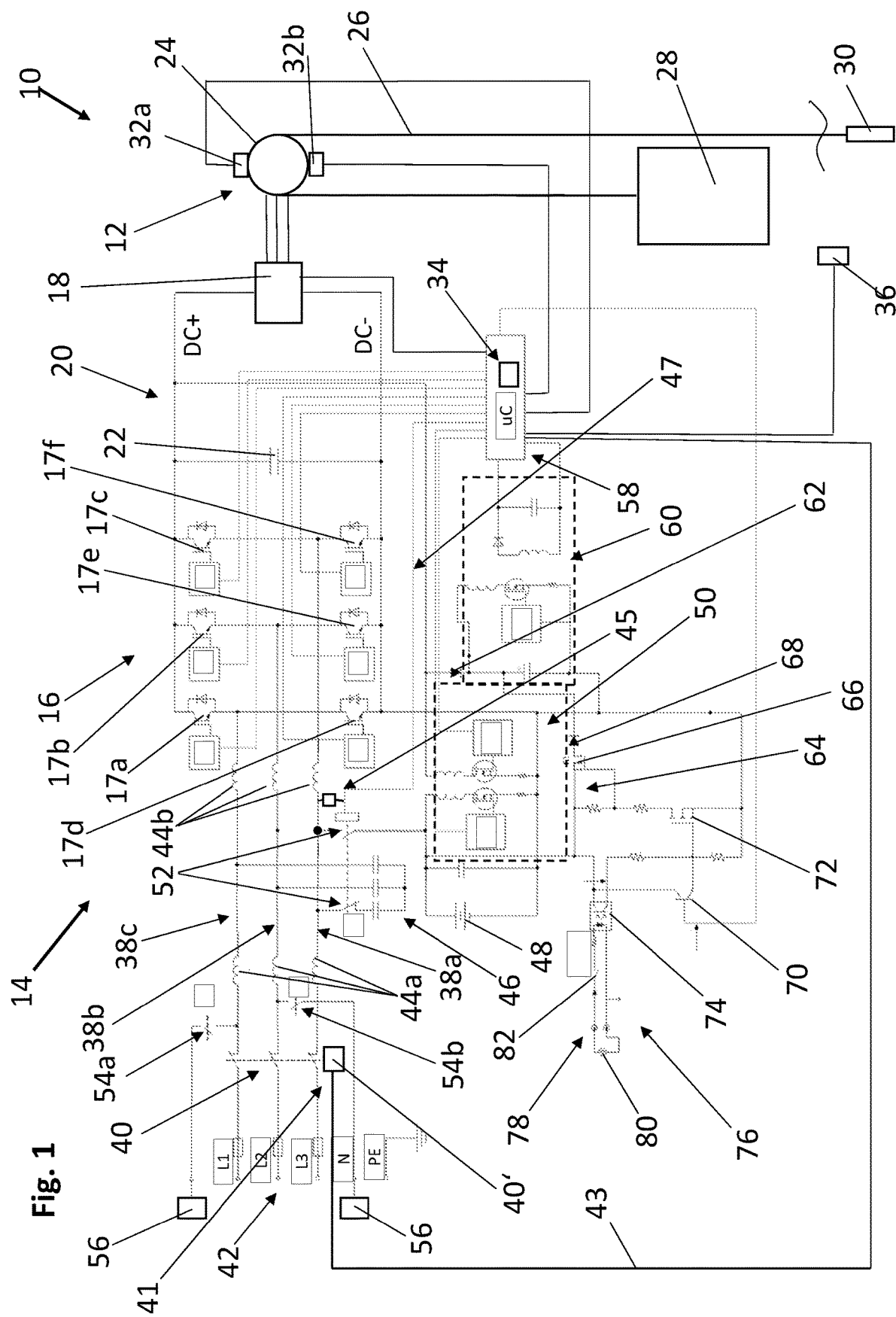

(51) Int. Cl.
*H02J 9/04* (2006.01)
*H02J 3/00* (2006.01)

(58) Field of Classification Search
USPC .......................................... 307/64
See application file for complete search history.

(56) References Cited

U.S. PATENT DOCUMENTS

| | | | | |
|---|---|---|---|---|
| 2012/0217099 A1* | 8/2012 | Gewinner | ............. | B66B 13/143 |
| | | | | 187/315 |
| 2018/0057309 A1* | 3/2018 | Nikander | ................ | B66B 5/027 |
| 2018/0334359 A1* | 11/2018 | Nikander | ................ | B66B 5/044 |
| 2019/0135585 A1* | 5/2019 | Nakari | .................... | B66B 1/306 |
| 2019/0300337 A1* | 10/2019 | Lindegger | ............... | B66B 13/22 |

\* cited by examiner

BACKUP POWER SUPPLY FOR ELEVATOR

The present invention relates to an elevator comprising an elevator motor, a motor drive for the elevator motor having a frequency converter comprising a rectifier bridge, an inverter bridge and a DC link in between, which frequency converter is controlled via a controller, the rectifier bridge being connected to mains via three feed lines comprising chokes, whereby the rectifier bridge is being realised via controllable semiconductor switches so that it is able to refeed electricity into mains during generator mode of the elevator or elevator group. Further, the elevator has an isolation relay being located between the feed lines and mains as well as a backup power supply at least for emergency drive operation. To effect an emergency drive, the elevator comprises an emergency control for performing an automatic emergency drive, which emergency control might be a separate component but is preferably integrated with the controller. For feeding power to the DC link the backup power supply is via a first switch connectable with only a first of said feed lines and the necessary Dc link voltage is provided via a boost activity of at least one of the semiconductor switches of the rectifier bridge connected with the first feed line and the at least one choke provided in the first feed line.

The controller regularly also controls the elevator brakes of the elevator to release them in normal operation as well as during an emergency drive. The backup power supply which is regularly realized via a battery may also be formed by other power supplies as e.g. supercapacitors. This technology forms the background of the invention. Such kind of elevator is disclosed in the WO 2008/100259 A1.

It is object of the present invention to provide an elevator which facilitates and allows an automatic emergency drive to release trapped passengers.

The object is solved with an elevator according to claim 1. The object is further solved with a method according to claim 17. Preferred embodiments of the invention are subject matter of the correlated dependent claims. Preferred embodiments of the invention are also described in the specification and drawings.

According to the invention, the second and/or third of said feed lines is via a second switch connectable to a power supply of an elevator car door, whereby the first switch connecting the backup power supply to the first feed line as well as the second switch connecting the power supply of the elevator car door are controlled by the emergency control.

This inventive solution enables the use of the rectifier bridge on one hand to act as a booster in connection with a choke in the first feed line to transform the DC voltage of the backup power supply, hereinafter battery, to the required DC link voltage and the second and third feed line are simultaneously used to provide alternating current as power supply for the elevator car door which power supply is connected via the second switch to the second and/or third feed line. Thus, the emergency control which is usually integrated in the controller is able to release the elevator brakes and to start rotating the elevator motor to move the elevator car to the adjacent landing of the elevator. When the elevator car has arrived at the landing, the emergency control is via the second and/or third feed line able to supply the necessary power for the elevator car door to open it so that the trapped passengers can be released. The emergency control may feed power for the elevator car door also during emergency drive, to provide closing torque to keep the doors closed. The rectifier bridge which is a modulated rectifier bridge comprising of semiconductor switches controlled by the controller is therefore able to simultaneously fulfil the task of increasing (boosting) the DC voltage for the DC link as well as to provide the AC voltage for the elevator car door.

The elevator comprises the automatic emergency drive function which is automatically performed by the emergency control in case of a power failure of (public) AC mains.

According to the invention, the elevator comprises a first feedback circuit configured to provide to the emergency control a first information indicating the switching state of the isolation relay and a second feedback circuit configured to provide to the emergency control a second information indicating the switching state of the first switch. The emergency control is configured to selectively allow or prevent the emergency run on the basis of the first information and the second information. With this measure it is possible to replace traditional safety relays or -isolation relays with normal isolation means, i.e. one or more isolation relays. These normal isolation means are not as reliable but simpler and cheaper than traditional safety relays. The lower reliability of the normal isolation means can be compensated with improved supervision by means of the emergency control/feedback circuits. For example, the emergency control may allow closing of the first switch only after it has detected opening of the isolation relay. Consequently, emergency control may allow closing of the isolation relay only after it has detected opening of the first switch. Emergency run may be allowed only after detecting a correct sequence of opening of the isolation relay and closing of the first switch.

In particular, the isolation relay may comprise an auxiliary contact and the first feedback circuit may be configured to provide to the emergency control as the first information an indication of switching state of the auxiliary contact. The second feedback circuit may be connected to the first feed line between the isolation relay and the first switch to provide to the emergency control as the second information an indication of presence or absence of line voltage in said first feed line between the isolation relay and the first switch. The second information thus indicates when line voltage is present or absent, i.e. is it possible to close the first switch. After closing the first switch, the second information indicates presence of backup power supply voltage, i.e. has the first switch closed properly. When this is the case, emergency run may be started.

Of course, the second feedback circuit could be connected with a switching status indicator of the first switch, e.g. an additional relay contact of the switch changing its signal status with the switching status. However, in a preferred embodiment of the invention the second feedback circuit is connected to the first feed line and is configured to provide to the emergency control information regarding the presence or absence of line voltage in said first feed line. Now the emergency control is configured to derive from the line voltage in the feed line information about the switching status of the first switch. This is a very easy way to get information about the switching status of the first switch without needing a switching status indicator of the first switch.

In a preferred embodiment of the invention the first feedback circuit comprises an auxiliary contact of the isolation relay connected to a signal line and is configured to provide to the controller or emergency control an indication of switching state of the isolation relay as the first information. This is an easy way to provide and forward the first information to the emergency control.

Preferably the emergency control is integrated with the controller so that it already shares with the controller all essential input and output lines necessary for the control of an emergency situation. This further provides a space saving solution and minimises the number of necessary components.

In a preferred embodiment of the invention, the backup power supply is connected to the DC link via a DC/DC converter, preferably in flyback topology. Via this measure, the capacitor of the DC link can be charged up to a sufficient voltage level before connecting the first feed line to the backup power supply to perform the boost action for the DC link. The advantage of the DC/DC converter is that the current provided by the DC/DC converter to the DC capacitor is limited so that the charge current peak which is present at the start of the charge up of the capacitor does not harm the DC/DC converter, the battery or the first switch. Furthermore, by the fact that now the DC link is charged up by the DC/DC converter and the battery to a certain level, the current is limited when the semiconductors of the rectifier bridge connected to the first feed line begin the boosting of the battery voltage to the DC link voltage. If this action would start with an unloaded capacitor, the high initial current might harm the corresponding semiconductors of the rectifier bridge.

In a preferred embodiment, the DC/DC converter is bidirectional and is configured on one hand to generate a DC voltage for the DC link which is higher than the battery voltage, and on the other hand the DC/DC converter is configured to form a charging circuit for the battery fed from the DC link. Thus, the DC/DC converter has two functions, i.e. to pre-charge the capacitor in case of mains power off so as to enable the above-mentioned emergency drive action and on the other hand to charge the battery during normal operation of the elevator. Via this measure, it is also ensured that the battery capacity is high enough in any case of mains power off.

Preferably, the manual drive circuit is disposed in a remote control unit outside of elevator shaft, so that the person performing the manual rescue drive does not need to enter the elevator shaft.

In a preferred embodiment of the invention a transformer is arranged between the car door arrangement (door operator) and the second switch, so that the supply voltage can be easily adapted to the requirements of the door arrangement.

In an alternative embodiment, the DC/DC converter is one directional such that is it configured only to charge the battery from the DC link. This means that the DC/DC controller only has one MOSFET transistor in the DC link side of the transformer, and the other MOSFET transistor in the battery side is not needed.

Preferably, the DC/DC converter comprises at least one PWM controller, preferably two PWM controllers, namely one on each side, which is/are controlled via the controller. The programs to control the PWM controllers are then preferably stored in the controller so that it is optimized for battery charging during normal operation as well as for pre-charging the capacitor in the DC link during emergency drive.

In this connection it is to be mentioned that preferably a capacitor is provided in the DC link which is the normal frequency converter topology to minimize voltage ripple in the DC link.

In a preferred embodiment of the invention, the controller comprises an auxiliary power input being connectable to the backup power supply. The DC link usually supplies power to the controller. Anyway, during periods of non-use, e.g. during nights as well as in any case of mains power off, the voltage of the DC link might drop so that is not any longer sufficient to form a power supply for the controller, at least to perform the emergency drive. In this case, this auxiliary power input is advantageous as it can be connected to the backup power supply during mains power off to ensure that all necessary operations in connection with an emergency drive, independent whether it is an automatic emergency drive or a manual emergency drive, can be performed.

Preferably, a second DC/DC converter is connected with the auxiliary power input. This has the advantage that the second DC/DC converter can boost or reduce the incoming voltage to the voltage level which is adapted as supply voltage for the controller. In this connection it is advantageous if the second DC/DC converter is a PWM-controlled which enables a wide input voltage range. In this case it is preferable that the PWM of the second DC/DC converter has its own separated control as the function of the controller is not ensured in case of mains power off because of missing supply voltage.

In a preferred embodiment of the invention, the DC/DC converter of the battery is connected to the auxiliary power input, preferably to the second DC/DC converter, preferably via a diode. In this case, the controller may receive the energy from the DC/DC converter in a mains power off situation when the DC/DC converter is starting to charge up the capacitor in the DC link which provides a DC voltage which is higher than that needed by the controller so that the voltage level can be adapted to the correct voltage for the controller by the second DC/DC converter. By providing the diode between the DC/DC converter and the second DC/DC converter, it can be ensured that the voltage is only flowing in the direction from the DC/DC converter to the second DC/DC converter and thus to the auxiliary power input of the controller. So the second DC/DC converter receives power from output of the DC/DC converter when it has higher voltage than the battery, otherwise second DC/DC converter receives power from the battery via the third switch whereby the first and second diodes act as selector or the highest input voltage for the second DC/DC converter.

Preferably, an activation circuit is provided between the backup power supply and the auxiliary power input, in which activation circuit a third switch is provided which is controlled via the emergency control (controller) as well as via the manual drive arrangement. Via this measure, power supply from the battery directly to the auxiliary power input—or to the second DC/DC converter connected to it—happens via this activation circuit. If the controller has still enough power, the emergency control closes the third switch which is preferably a semiconductor switch and thus it is ensured that the battery is connected with the auxiliary power input of the controller, possibly via the second DC/DC converter to ensure a correct voltage level. Thus, in any case of mains power off, a reliable function of the controller and the emergency control is ensured via this activation circuit and the controller can keep awareness of current elevator status.

Preferably, the third switch is connected to the second DC/DC converter via a diode, which ensures that power only flows one way to the auxiliary power input of the controller. As preferably also the first DC/DC converter is connected to the auxiliary power input—or second DC/DC converter—via a diode the power is fed to the auxiliary power input either from the DC/DC converter or from the activation circuit, i.e. which source provides the higher supply voltage level.

Preferably the second DC/DC converter is PWM-controlled enabling a wide input voltage range.

Preferably, at least one capacitor is connected between the positive and negative branch of the DC link. This capacitor smoothes the ripple in the DC voltage of the DC link. Preferably this capacitor may be formed by a series connection of two capacitors in which case the connection point of the two capacitors can be used as a neutral point of the DC link.

Preferably, the third switch in the activation circuit is controlled via at least one semiconductor switch controlled by the emergency control as well as by the manual drive arrangement. That means the emergency control during its automatic emergency drive function controls the third switch to close so that power is fed from the battery to the auxiliary power input of the emergency control (controller).

Preferably, at least one capacitor is connected between the positive and negative branch of the DC link which enables a smooth DC link voltage preferably when the DC link voltage is boosted via the connection of the backup power supply to the first feed line in connection with its choke and the corresponding semiconductor switches of the rectifier bridge.

It is further to be mentioned that the semiconductor switches of the rectifier bridge connected to the first feed lines are operated during boost operation preferably with a frequency of 100 Hz-10 kHz to provide in connection with the choke located in the first feed line the sufficient DC voltage for the DC link. Hereby, the semiconductor switch of the lower half-bridge controls via its switching cycle the voltage, which is based on the inductance voltage peaks of the choke(s), which voltage peaks run via the anti-parallel diode of the upper semiconductor switch to the positive branch of the DC link. Of course via this measure a voltage is boosted which is much higher than the feed voltage of the backup power supply.

Preferably, the semiconductor switches of the rectifier bridge are provided with antiparallel diodes, so that easier voltage boosting function in the above sense is enabled.

The invention also refers to a method for performing a rescue operation in an elevator according to the type which is described above. This method works as follows: In case of mains power off, the isolation relays are opened so that the feed lines are no longer connected with AC mains. Then, the backup power supply is initiated to feed direct current to the DC link via the DC/DC converter which boosts the DC voltage to a level which is adapted for the DC link (regularly several hundred volts) from the battery voltage level (regularly 20 to 63 V). This pre-charges the capacitor in the DC link.

The emergency control (controller) then energizes an activation circuit via the emergency control, which activation circuit connects the backup power supply to an auxiliary power input of the emergency control to perform an automatic emergency drive. The backup power supply is connected to the first feed line and the lower semiconductor of the rectifier bridge connected to the first feed line is controlled to switch, e.g. with a frequency between 100 Hz and 100 kHz which is optimal for voltage boosting. In the automatic rescue drive, the emergency control energizes the elevator brakes to release by controlling power supply from the DC link to the brakes and begins rotating the elevator motor via control of the inverter bridge.

Via the semiconductor switches connected to the second and/or third feed line an AC voltage is created in the second and/or third feed line which is/are connected as power supply to the door arrangement of the elevator car.

After the elevator car has reached a landing zone the car doors are opened to release the passengers with the supply voltage fed via the second and/or third feed line.

Via the semiconductor switches of the rectifier bridge connected to the second and third feed line, an AC voltage is created in these feed lines, and the second and/or third feed line is connected via a second switch to the door arrangement, i.e. door drive and door controller of the elevator car as a power supply. If only one of the second or third feed line is connected as a power supply to the car arrangement the other pole for the power supply has to be created by a neutral voltage level of the DC link. This neutral point could be created for example by using the connection point between two capacitors which are connected in series between the two branches of the DC link. Thus either the power supply is between the second or third feed line on one hand and the neutral point on the other hand or between the second and third feed line. After the elevator car has reached a landing zone, the car doors are then opened via the connection of the second and/or third feed line to the door drive of the elevator car. Thus, an automatic drive for releasing trapped passengers is possible in an economical way.

Preferably, a transformer is arranged between the car door arrangement and the second switch such that the AC voltage created in the second and third feed lines is supplied to the transformer and transformed to an adapted voltage for the door arrangement.

Preferably, the DC/DC converter which is used to pre-charge the capacitor in the DC link before connecting the backup power supply to the first feed line is used in a normal elevator operation as a charging circuit for the backup power supply. Thus, the different functions can be realized with a minimum of hardware components.

It shall be clear that the controller may be a separate or integrated part of the elevator control, and it may comprise or being connected with the control of the elevator brakes to release the elevator brakes during an emergency drive. Hereinafter, the control of the elevator brakes is described to be integrated with the controller, but it is clear that it may be a separate control component connected to the elevator control and/or controller. The controller is usually a digital signal processor which is connected by control lines with the semiconductors of the rectifier bridge as well as of the inverter bridge and it has inputs for obtaining status data of the elevator motor as velocity and electric values of the inverter bridge and of the elevator motor.

Above, the power supply to the emergency control (controller) in case of mains power off has been realized via its auxiliary power input. Of course, the auxiliary input is preferable but not really necessary to perform the above functions. In this case the power is fed from the DC/CD converter or activation circuit to the (normal) power input of the emergency control (controller).

The semiconductor switches of the rectifier bridge and/or inverter bridge may preferably be IGBTs or MOSFETs or SiC MOSFETs.

It shall be clear for the skilled person that the above-mentioned embodiments may be combined with each other arbitrarily.

Following terms are used as synonyms: backup power supply—battery; rectifier bridge—modulated rectifier bridge; DC/DC converter—first DC/DC converter; capacitor—smoothing capacitor; elevator brake—motor brake; landing zone indicator—door zone indicator; fourth switch—opto coupler; controller—controller including emergency control—emergency control;

The invention is hereinafter described via a preferred embodiment in connection with the drawings.

Figure 2:
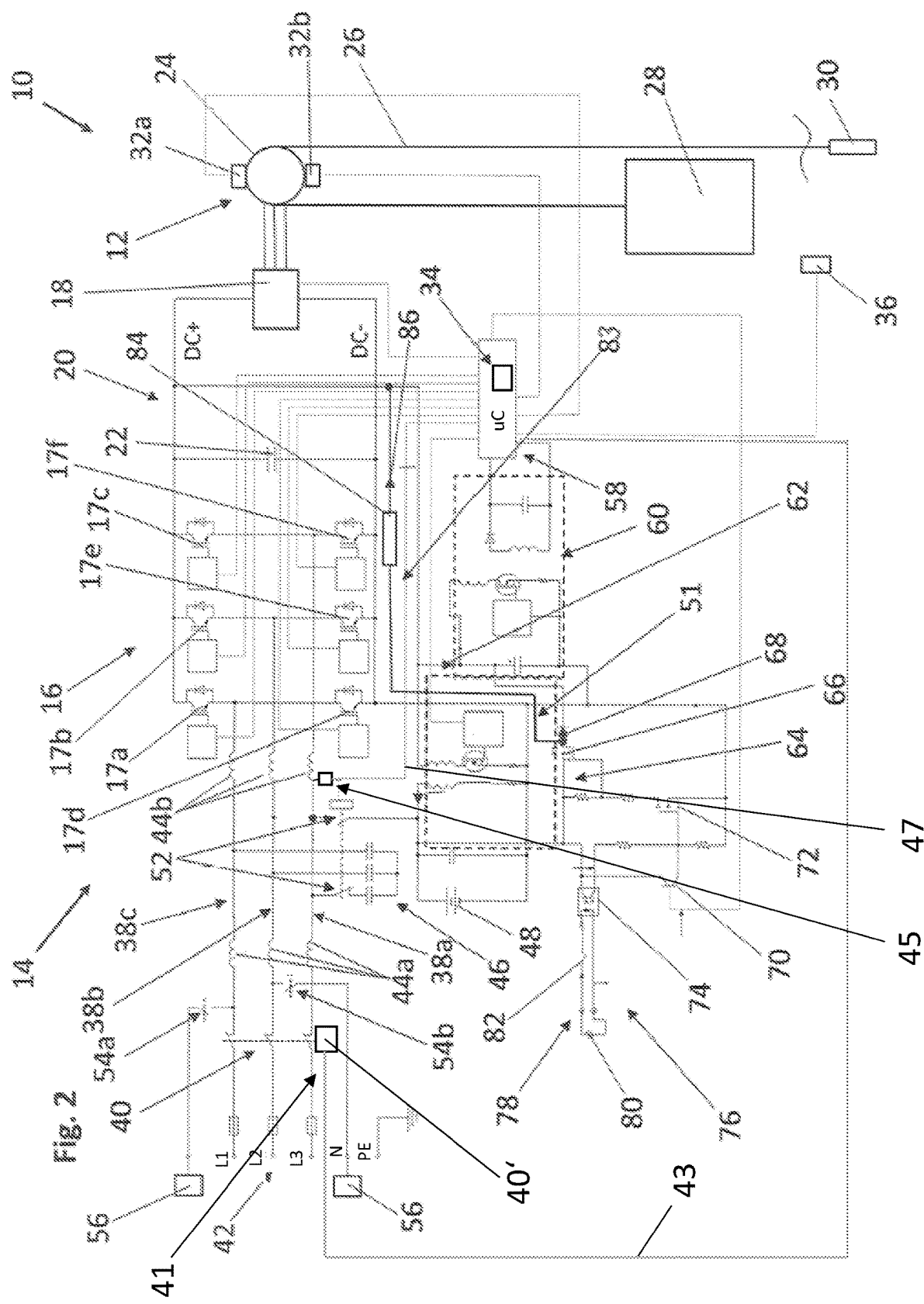

FIG. 1 shows an electric diagram of the motor and brake drive section of an elevator including automatic emergency drive components, and FIG. 2 shows an electric diagram similar to FIG. 1 with a simplified charging arrangement for the backup power supply.

FIG. 1 shows an elevator 10 comprising an elevator motor 12 which is controlled by an elevator drive 14 which is embodied as a frequency converter comprising a modulated rectifier bridge 16 consisting of semiconductor switches with antiparallel diodes, an inverter bridge 18 and a DC link 20 in between. The DC link 20 comprises a smoothing capacitor 22. The elevator motor 12 comprises preferably a traction sheave 24 over which a hoisting rope 26 is running carrying an elevator car 28 and optionally a counterweight 30. Alternatively, the hoisting rope 26 may be connected with the underside of the car to build a closed loop (with or without counterweight 30). Further, the elevator motor 12 comprises two parallel elevator brakes 32a, 32b. Finally, a controller 34 is provided which additionally forms an emergency control of the elevator drive 14. The controller 34 controls the semiconductor switches 17 of the rectifier bridge 16, the semiconductor switches of the inverter 18, the elevator brakes 32a, 32b and it is connected with a landing zone indicator 36 showing whether or not the elevator car has arrived a landing zone of the elevator 10. Preferably the controller gets input of the electrical values of the inverter bridge and elevator motor and eventually a tachometer signal of an encoder at the motor shaft or traction sheave.

The rectifier bridge 16 is connected via three feed lines 38a-c to an isolation relay 40. The three feed lines 38 a-c are connected via the isolation relay 40 with AC mains 42, i.e. with normally a three-phase AC public network. In each feed line 38a-38c, two chokes 44a, 44b are located. The isolation relay 40 comprises an auxiliary contact 40' connected to a signal line 43. The auxiliary contact 40' and the signal line 43 form a first feedback circuit 41 to provide an indication of the switching state of the isolation relay 40 to the emergency control 34 as first information. Between the feed lines 38a-38c, a capacitor bridge 46 is connected which in connection with the chokes 44a and 44b act as an AC line filter. The elevator drive 14 comprises a backup power supply 48 preferably in form of a battery which is connected to a DC/DC converter 50, preferably in a flyback topology. The DC/DC converter 50 comprises on both sides a PWM controller which is controlled by the controller 34. The battery 48 is connected via a first switch 52 to the first feed line 38a. A second feedback circuit 47 is provided between the first switch 52 and the controller (emergency control) 34 which second feedback circuit 47 is configured to provide to the emergency control 34 second information indicating switching state of the first switch 52. This second feedback circuit 47 may receive the switching status via a relay contact of the first switch 52. Alternatively or additionally the second feedback circuit 47 may be connected to the first feed line 38a, e.g. via a resistor 45. When the isolation relay 40 opens, normally there is no voltage on the feed line any longer. However, when the first switch 52 closes the feed line is provided with voltage from the battery 48. Thus, by detecting the voltage in the first feed line it is possible to derive the switching status of the first switch 52.

The first switch 52 also disconnects the capacitor bridge 46 from the first feed line 38a simultaneously with connection to the battery 48. The second and third feed line are connected with second switches 54a, 54b with door arrangement 56 comprising a door controller as well as a door drive and the car door.

The controller 34 has preferably an auxiliary power input 58 connected preferably to a second DC/DC converter 60. The second DC/DC converter 60 acts as a kind of voltage regulator for the auxiliary power input 58 of the controller 34.

While the first branch of the DC/DC converter 50 is connected with the battery 48, the second branch is connected to the DC link 20. Furthermore, additionally the second branch of the DC/DC converter 50 is connected via a first diode 62 to the second DC/DC converter 60 at the auxiliary power input 58 of the controller 34. The battery 48 is via an activation circuit 64 directly connected to the second DC/DC converter 60, and thus to the auxiliary power input 58 of the controller 34. The activation circuit 64 comprises a third switch 66 and a second diode 68. So the second DC/DC converter 60 receives power from output of the DC/DC 50 converter when it has higher voltage than the battery 48, otherwise second DC/DC converter 60 receives power from the battery 48 via the third switch 66 whereby the first and second diodes 62 and 68 act as selector or the highest input voltage for the second DC/DC converter 60.

In this activation circuit 64 the third switch 66 is preferably a semiconductor switch which is activated via a boost transistor 72 connected to the gate of the third switch 66. The boost transistor 72 is controlled either via a transistor 70 (or other semiconductor switch) which is controlled via the controller 34. The function of the elevator 10 in an emergency case is carried out hereinafter:

In case of a power off of the mains 42, the isolation relay 40 is opened. Now, there are two cases. The first case is that the voltage level in the DC link 20 is sufficiently high enough for the controller 34 to operate. In this case, the transistor 70 controlled by the controller 34, i.e. the emergency control thereof, is activated which closes the third switch 66 in the activation circuit 64 so that the battery 48 is via the second DC/DC converter 60 connected to the auxiliary power input 58 of the controller 34. This power supply via the activation circuit 64 to the auxiliary power input 58 enables the controller 34 to operate properly. Now the controller 34 controls the two PWM controllers of the DC/DC converter 50 to charge up the smoothing capacitor 22 in the DC link 20.

As it has been mentioned above, the first feedback circuit 41 is connected between the isolation relay 40 and the controller 34 to indicate isolation relay 40 status to the controller 34. This feedback circuit 41 may comprise an auxiliary contact 40', which is connected to a signal line 43 of the feedback circuit 41 that leads to the input of the controller 34. The auxiliary contact 40' selectively interrupts or connects a detection signal to the input of the controller 34 such that status of the auxiliary switch 40'/isolation relay 40 can be determined therein.

A second feedback circuit 47 is connected between the first switch 52 and the controller 34 to indicate first switch 52 status to the controller 34. The first switch 52 may be provided with an auxiliary contact, which is connected to a signal line that leads to input of the controller 34. The auxiliary contact selectively interrupts or connects a detection signal to the input of the controller 34 such that status of the auxiliary switch/isolation relay 40 can be determined therein.

The second feedback circuit 47 is connected between the first switch 52 and the emergency control 34 to additionally indicate the status of the first switch (52) to the emergency control (34). The emergency control 34 is configured to selectively allow or prevent an emergency run on the basis of the status of the isolation relay 40 and the status of the first switch 52.

After the voltage in the DC link 20 has reached a sufficient level, the first switch 52 is closed by the controller 34 so that the battery 48 is connected to the first feed line 38a. Simultaneously, the capacitor bridge 46 is separated from the first feed line 38a. Now, a DC voltage is connected to the first feed line 38a and the lower semiconductor 17f of the rectifier bridge 16 is controlled to open and close in a frequency of about 100 Hz to 10 kHz. This leads to corresponding voltage peaks of the chokes 44a and 44b in the first feed line 38a which voltage flows via the antiparallel diode of the upper semiconductor 17c to the DC link 20 and charges it to a desired voltage level. Via the fact that the smoothing capacitor 22 in the DC link has been pre-charged by the DC/DC converter 50, the current flowing through the antiparallel diode 17c is not too high for it to be harmed. Now, also the DC link 20 has a sufficient voltage level so that the second switches 54a, 54b can be closed to energize the door arrangement 56 to ensure that the car doors are closed during emergency drive. The controller 34 now controls the elevator brakes 32a and 32b to release and controls the semiconductors in the inverter bridge 18 to rotate the elevator motor 12. When the elevator car 28 has reached the level of a door zone, this is signalized to the controller 34 via landing zone indicator 36. Then the controller 34 stops rotating the elevator motor 12 and de-energizes the elevator brakes 32a, 32b enabling them to grip and keep the traction sheave 24 stopped. Now, the controller 34 initiates the door controllers and door drives of the door arrangement 56 to open the car door which is possible via the power supply via the second and third feed lines 38b and 38c which are connected to the door drive and door controller via second switch 54a, 54b. As normally the car doors connectors are coupled to the corresponding landing doors both are opened and the trapped passengers can be released.

If in a second situation the voltage level in the DC link at the beginning of the emergency drive is not sufficiently high for the controller 34 to work, the controller 34 is not able to activate the transistor 70 to close the third switch 66 in the activation circuit 64. In this case, a maintenance person or an operator has to push a manual drive switch 82 in the manual drive circuit 78 which closes the fourth switch 74 parallel to the transistor 70 and thus closes via boost transistor 72 the third switch 66 connecting the battery 48 to the second DC/DC converter 60 at the auxiliary power input 58 of the controller 34 via the second diode 68. Now, the controller 34 is able to work and to start the necessary steps for performing the manual emergency drive as mentioned above with starting pre-charging the capacitor 22 in the DC link 20 via the DC/DC converter 50. Usually the manual drive switch has to be kept pushed until the car has arrived at a landing and the doors are opened so that the trapped persons may be released.

The automatic emergency drive may be started automatically or controlled via a remote maintenance centre, which is connected to the controller 34 (and/or the elevator control) via a public communication network.

An alternative embodiment shown in FIG. 2 is almost identical to FIG. 1 with the difference that the DC/DC converter 51 is only one directional such that is it configured only to charge the battery 48 from the DC link, but in contrast to FIG. 1 it is not able to feed boosted DC voltage to the DC link 20. In this case the DC/DC controller 51 only has one PWM controlled MOSFET transistor in the DC link side of the transformer, and the other MOSFET transistor in the battery side is not needed.

In this alternative embodiment, the initial charging of DC link takes place via a pre-charge line 83 in which a current limiting resistor 84 and a third diode 86 is connected. This pre-charge line is connected between the output of the third switch 64 and the positive branch DC+ of the DC link 20. This embodiment has the advantage of lower cost. Of course in this case the capacitor 22 can only be charged to the voltage level of the battery 48.

The capacitor 22 in the DC link 20 can also be formed by a series connection of two capacitors in which case the connection point of the two capacitors is used as a neutral point of the DC link, e.g. for connecting the door arrangement 56 between only one of the second or third feed line 38b, 38c and this neutral point.

The above elevator therefore allows automatic as well as manual emergency drive operation with a minimum of hardware components and with a high level of security and reliability.

The invention is not restricted to the disclosed embodiments but may be varied within the scope of the claims as attached.

LIST OF REFERENCE NUMBERS 10 elevator
12 elevator motor
14 elevator drive
16 rectifier bridge
18 inverter bridge
20 DC link (DC+, DC−)
22 smoothing capacitor
24 traction sheave
26 hoisting rope—a set of hoisting ropes
28 elevator car
30 counterweight
32a,b elevator brakes—motor brakes
34 controller (including emergency control, e.g. being part of the elevator control)
36 landing zone indicator—door zone indicator
38a,b,c three feed lines to the rectifier bridge
40 main isolation relay
40' auxiliary contact
41 first feedback circuit
42 AC mains (public AC network)
43 signal line of the first feedback circuit
44a first chokes in the feed lines
44b second chokes in the feed lines
45 resistor between first feed line and second feedback circuit
46 capacitor bridge
47 second feedback circuit
48 backup power supply—battery
50 (first) DC/DC converter
52 first switch (relay)
54a,b second switch
56 door arrangement (door drive with door controller and car door)
58 auxiliary power input of the controller
60 second DC/DC converter at auxiliary power input
62 first diode between DC/DC converter and second DC/DC converter
64 activation circuit
66 third switch
68 second diode
70 transistor controlled by the controller 72 boost transistor for third switch
74 fourth switch—opto coupler
76 manual drive arrangement
78 manual drive circuit
80 second backup power supply—second battery in the manual drive circuit
82 pre-charge line
83 pre-charge line
84 resistor
89 third diode

The invention claimed is:

1. An elevator comprising:
   an elevator motor;
   a motor drive for the elevator motor having a frequency converter comprising a rectifier bridge, an inverter bridge and a DC link in between, the frequency converter being controlled via a controller, the rectifier bridge being connected to AC mains via three feed lines comprising chokes, and the rectifier bridge being realised via controllable semiconductor switches;
   an isolation relay located between the feed lines and AC mains;
   a backup power supply, at least for emergency drive operation; and
   an emergency control for performing an automatic emergency drive,
   wherein the backup power supply is, via a first switch, connectable with only a first of said feed lines,
   wherein a second and/or third of said feed lines is, via a second switch, connectable as power supply to a car door arrangement, while the second and third feed lines are separated from AC mains with the isolation relay,
   wherein the first switch, as well as the second switch, are controlled by the emergency control,
   wherein the elevator further comprises:
      a first feedback circuit configured to provide to the emergency control first information indicating the switching state of the isolation relay; and
      a second feedback circuit configured to provide to the emergency control second information indicating switching state of the first switch, and
   wherein the emergency control is configured to selectively allow or prevent the emergency drive operation on the basis of the first information and the second information.

2. The elevator according to claim 1, wherein the second feedback circuit is connected to the first feed line, the second feedback circuit being configured to provide to the emergency control information regarding the presence or absence of line voltage in said first feed line, and
   wherein the emergency control is configured to derive from the line voltage in the feed line information about the switching status of the first switch.

3. The elevator according to claim 1, wherein the first feedback circuit comprises an auxiliary contact of the isolation relay connected to a signal line, and is configured to provide to the emergency control an indication of the switching state of the isolation relay as the first information.

4. The elevator according to claim 1, wherein the backup power supply is connected to the DC link via a DC/DC converter.

5. The elevator according to claim 4, wherein the DC/DC converter is bidirectional and is configured to generate a DC voltage for the DC link which is higher than the backup power supply voltage, and which DC/DC converter is further configured to be a charging circuit for the backup power supply fed from the DC link.

6. The elevator according to claim 4, wherein the DC/DC converter is one directional and a pre-charging line is connected between the backup power supply and the positive busbar (DC+) of the DC link via a third switch of an activation circuit.

7. The elevator according to claim 4, wherein the DC/DC converter comprises at least one PWM controller which is/are controlled via the controller.

8. The elevator according to claim 4, wherein the DC/DC converter is connected to the auxiliary power input.

9. The elevator according to claim 4, wherein the backup power supply is connected to the DC link via the DC/DC converter in flyback topology.

10. The elevator according to claim 8, wherein the DC/DC converter is connected to a second DC/DC converter at the auxiliary power input via a first diode.

11. The elevator according to claim 1, wherein the controller comprises an auxiliary power input being connectable to the backup power supply.

12. The elevator according to claim 11, wherein a second DC/DC converter is located in the auxiliary power input.

13. The elevator according to claim 11, wherein an activation circuit is provided between the backup power supply and the auxiliary power input, in which activation circuit a third switch is provided which is controlled via the emergency control and via a manual drive circuit.

14. The elevator according to claim 13, wherein the third switch is connected to a second DC/DC converter located at the auxiliary power input via a second diode.

15. The elevator according to claim 13, wherein the third switch is controlled via at least one transistor controlled by the emergency control.

16. The elevator according to claim 15, wherein parallel to the transistor a fourth switch of the manual drive circuit is connected, which is an opto-coupler.

17. The elevator according to claim 16, wherein the manual drive circuit comprises a second backup power supply and a manual drive switch, which manual drive circuit controls the third switch via the opto-coupler.

18. The elevator according to claim 1, wherein the backup power supply is or comprises a battery.

19. A method for performing a rescue operation in the elevator according to claim 1, comprising the following steps:
   in case of mains power off, opening the isolation relay and initiating the backup power supply to feed direct current to the DC link via a DC/DC converter;
   energizing an activation circuit via the emergency control, the activation circuit connecting the backup power supply with an auxiliary power input of the emergency control to selectively perform an automatic emergency drive;
   connecting the backup power supply to the first feed line and controlling the lower semiconductor of the rectifier bridge connected to the first feed line to switch with a frequency between 100 Hz and 100 kHz;
   whereby in the automatic emergency drive, the emergency control energizing the elevator brakes to release by controlling power supply from the DC link to the brakes and begins and beginning rotating the elevator motor via control of the inverter bridge;
   wherein via the semiconductor switches connected to the second and third feed line creating an AC voltage in the second and/or third feed line which is/are connected as power supply to the door arrangement of the elevator car; and after the elevator car has reached a landing zone opening the car doors to release the passengers with the supply voltage fed via the second and/or third feed line.

20. A method for operating the elevator according to claim 1, and designed to use a method for performing a rescue operation in the elevator, the method for performing a rescue operation comprising the following steps:

in case of mains power off, opening the isolation relay and initiating the backup power supply to feed direct current to the DC link via a DC/DC converter;

energizing an activation circuit via the emergency control, the activation circuit connecting the backup power supply with an auxiliary power input of the emergency control to selectively perform an automatic emergency drive;

connecting the backup power supply to the first feed line and controlling the lower semiconductor of the rectifier bridge connected to the first feed line to switch with a frequency between 100 Hz and 100 kHz;

whereby in the automatic emergency drive, the emergency control energizing the elevator brakes to release by controlling power supply from the DC link to the brakes and begins and beginning rotating the elevator motor via control of the inverter bridge;

wherein via the semiconductor switches connected to the second and third feed line creating an AC voltage in the second and/or third feed line which is/are connected as power supply to the door arrangement of the elevator car; and after the elevator car has reached a landing zone opening the car doors release the passengers with the supply voltage fed via the second and/or third feed line, wherein the DC/DC converter is used in normal elevator operation to charge the backup power supply.

* * * * *